United States Patent [19]

Bjorklund et al.

[11] Patent Number: 5,539,824
[45] Date of Patent: Jul. 23, 1996

[54] METHOD AND SYSTEM FOR KEY DISTRIBUTION AND AUTHENTICATION IN A DATA COMMUNICATION NETWORK

[75] Inventors: Ronald E. Bjorklund, Gattieres; Frederic Bauchot, Saint Jeannet; Michele M. Wetterwald, Cagnes Sur Mer, all of France; Shay Kutten, Rockaway, N.J.; Amir Herzberg, Bronx, N.Y.

[73] Assignee: International Business Machines Corporation, Armonk, N.Y.

[21] Appl. No.: 348,656

[22] Filed: Dec. 2, 1994

[30] Foreign Application Priority Data

Dec. 8, 1993 [EP] European Pat. Off. ............. 93480219

[51] Int. Cl.$^6$ .................................................. H04N 9/32
[52] U.S. Cl. ................. 380/21; 380/23; 380/25; 380/30
[58] Field of Search .......................... 380/21, 23, 25, 380/30

[56] References Cited

U.S. PATENT DOCUMENTS

| | | | |
|---|---|---|---|
| 5,199,072 | 3/1993 | White et al. | 380/44 |
| 5,202,921 | 4/1993 | Herzberg et al. | 380/21 X |
| 5,319,711 | 6/1994 | Servi | 380/23 |
| 5,442,703 | 8/1995 | Kim et al. | 380/21 |

OTHER PUBLICATIONS

Computers & Security International Journal Devoted to the Study of Tech. & Financial Aspects of Computer Security, vol. 9, No. 2, Apr. 1990 145–152.

*Primary Examiner*—Gilberto Barrón, Jr.
*Attorney, Agent, or Firm*—Stephen T. Keohane

[57] ABSTRACT

This invention deals with a safe key distribution and authentication in a data communication network (e.g. wireless LAN type of network).

The network includes a network manager to which are connected, via a LAN wired circuit, one or more base stations. Individual remote stations are, in turn, wirelessly connected to an installed base station.

One essential function for achieving security in such a network, is a mechanism to reliably authenticate the exchanges of data between communicating parties. This involves the establishment of session keys, which keys need to be distributed safely to the network components. An original and safe method is provided with this invention for key distribution and authentication during network installation, said method including using the first installed base station for generating a network key and a backbone key, and then using said first installed base station for subsequent remote station or additional base station installations while avoiding communicating said network key.

9 Claims, 8 Drawing Sheets

METHOD AND SYSTEM FOR KEY DISTRIBUTION AND AUTHENTICATION IN A DATA COMMUNICATION NETWORK

FIELD OF THE INVENTION

This invention deals with key distribution and authentication in a data communication network, and more particularly with key authentication in a wireless LAN type of network.

BACKGROUND OF THE INVENTION

Conventional data communication networks include a host station or network manager providing network control by being connected to a network including one or several node stations, which, in turn concentrate and manage the traffic provided from/to remote terminal stations. In principle, several terminal stations are attached to each node station, such as to provide a sub-network which can be referred to as a cell.

One such network to be more particularly considered in this invention may be defined as a wireless Local Area Network (LAN). Such a network to be disclosed in details in the following description includes remote stations connected to individual nodes or base stations, via radio links with the base station(s), in turn, connected to a host (or network) manager (herein also referred to as wireless manager) via a wired LAN circuitry.

But regardless of be the network architecture, the data traffic must be protected as the system poses increasing threats to the security of communications and operations involving end-users and network components.

This problem has already received particular attention from the data communication industry sector. In fact, security is a must, and customers always include this feature in defining their requirements or network functional characteristics. One may easily understand their concern on the matter when bearing in mind that in such networks the flow of data carries very sensitive proprietary information relating to the customers company operation, e.g., cash-flows, prices, correspondence within the network, requests from their own customers, etc. . . .

One essential function for achieving security in such a network is a mechanism to reliably authenticate the exchange of messages between communicating parties. This involves the establishment of a session key, which key needs being distributed safely.

One such system has been described by S. P. Miller, B. C. Newman, J. I. Schiller and J. H. Saltzer, as the "Kerberos Authentication and Authorization System" of the M. I. T. Project Athena, Cambridge, Mass., December 1987. The proposed system requires using physical protection and synchronization operations. This is however troublesome and a heavy burden to carry when it addresses private networks made for non-technical customers wishing to minimize their own implications on the network buildup. Besides, it adds to the original cost of the network and therefore makes the proposed network installation less competitive. Other approaches involve using so-called public key cryptography operations which are computationally expensive and imply the need to compute and store in a Key Distribution Center, all the Public key / Private key couples prior to the stations initializations.

In some cases public keys are provided to all station attaching to the network, by using carrying security personnel which is both heavy to handle and expensive.

Another approach requires each station to be initialized in a secure central location before being shipped to their destination. This is again an expensive process, especially if the customer has to do it.

SUMMARY OF THE INVENTION

One object of this invention is to provide a method and system for key authentications which is both safe in an insecure network environment while being easy to be operated by a non-professional user. Another object of this invention is to provide such a method for a so-called wireless LAN network combining both wireless communications with wired LAN.

Still another object of this invention is to provide a method for distributing private keys needed in an authentication procedure of a wireless LAN remote and base stations.

These and other characteristics, objects and advantages of this invention will become more apparent from the following description made with reference to the attached figures.

BRIEF DESCRIPTION OF THE FIGURES

FIG. 1 represents a wireless LAN topology with a two-level hierarchical network structure the invention should be applied to.

FIG. 3 (including FIG. 3a and 3b) FIG. 4 (including FIG. 4a and 4b)

DESCRIPTION OF THE PREFERRED EMBODIMENT OF THE INVENTION

This description shall refer to a so-called wireless LAN.

It should, however, already be understood, that the wireless LAN to be described herein in further details as to those characteristics requested for the invention, should in no way be considered to be limitative. For instance, one should understand that the invention obviously applies to different kinds of network architectures, be they wireless or wired.

However, just for the sake of simplifying this description and defining clearly the inventive concept the description shall refer to a best mode of implementation made according to the topology represented in the attached figures.

Figure 1:
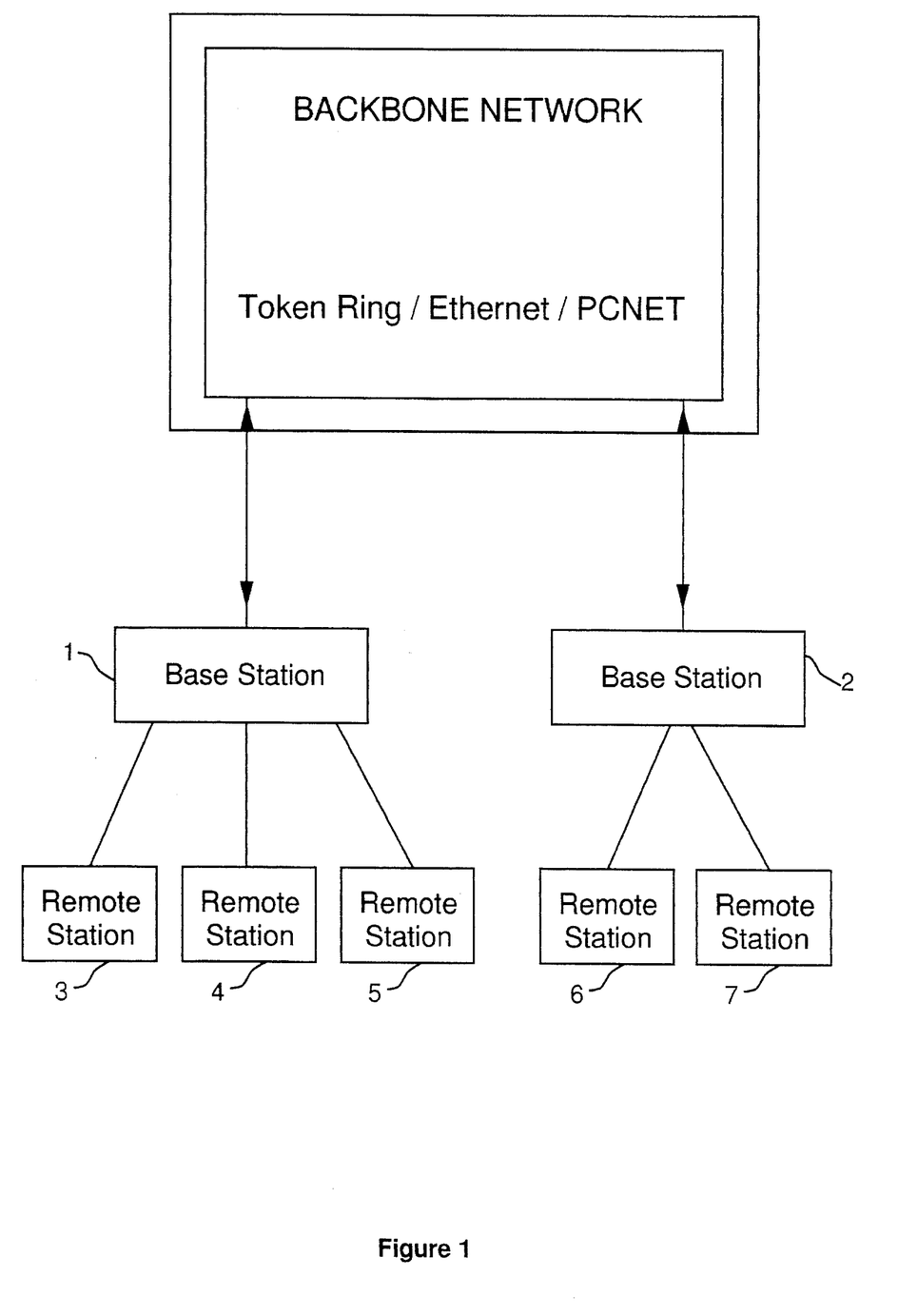

Let's first consider a wireless LAN topology with a two-level hierarchical network structure, as represented in FIG. 1. The whole geographical area to be covered by the communication network is divided into cells. Associated with each cell is a base station 1, 2 etc, that is connected to a backbone network and acts as access point or relay, to a number of remote (mobile) stations 3, 4, 5, 6, 7 individually communicating with one base station over a wireless channel. The number of remote stations may vary throughout time, some leaving and others attaching to the network. Also, the individual cells topography may vary since any individual mobile station may gain access to the network via any of the several base stations.

Typically, a mobile station registers with one of the base stations to gain access to the network. All communications between the mobile station and other entities are subsequently handled by the base station with which it was registered.

As an example, one may consider the environment of an industrial campus consisting of several office buildings. The buildings are divided into cells, which cells are connected via some backbone network such as a wired LAN (e. g. Ethernet/token ring). Mobile stations such as portable computer terminals which can operate both indoor and outdoor with limited range, use a wireless link to access the base stations on the backbone network. Each base station controls the set of mobile stations in its cell.

Figure 2:
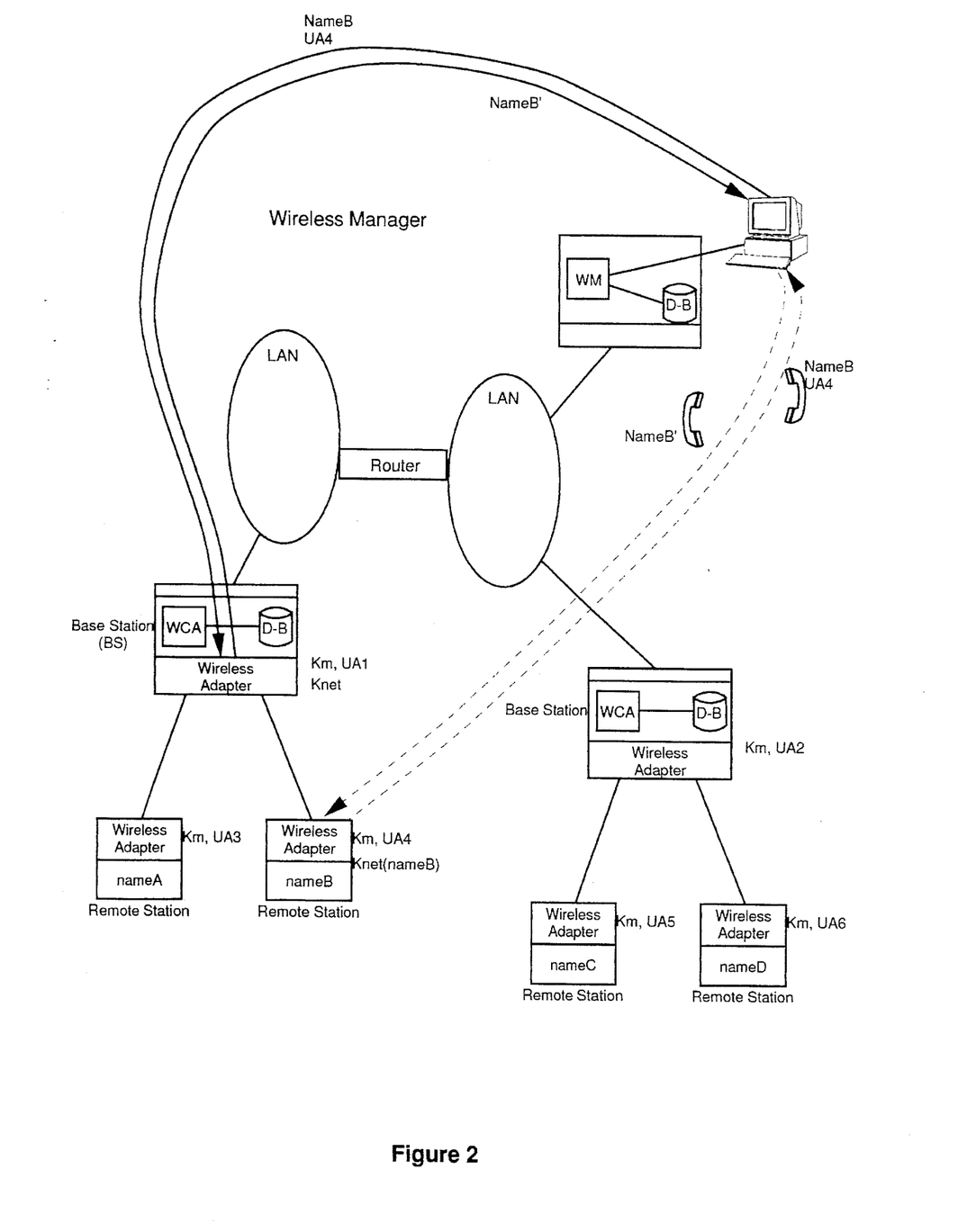
FIG. 2 represents the complete network including a network manager and showing the various items and parameters to be used for the invention.

The two-level cellular architecture with wireless links and backbone LANs, as considered in the preferred embodiment of this invention offers several advantages. For instance, non-overlapping cells that are some distance apart can have independent transmission access channels without any interference. Hence, the capacity of the system can be significantly increased. In addition, the management functions such as signalling and access protocol for the wireless access channel can be simplified greatly since each cell can be operated independently. But this architecture should in no way be construed as limiting the scope of this invention which, as will become apparent from the following description, obviously applies also to any other architecture such as one using a higher number of levels, for instance. The base station itself is actually a router or a bridge between the wireless LAN cell and the LAN backbone and in turn up to a network station or host device. Accordingly, and as represented in FIG. 2, the complete network shall also include a network station for managing the whole network. Said network manager shall herein be also referred to as Wireless Manager.

Communications between remote stations (RS) and base station (BS) are performed through Adapter Units each including a cell control device (CC) or more generally software implemented means for performing adapter functions. Each base station is also provided with a wireless control agent (WCA) function, while the network station is provided with a wireless manager (WM) function. Each base and network station is provided with a storage device (DB) including a data base and ROM facilities in the adapters.

The description of the operation of these devices shall herein be limited to sole implication within the invention.

The purpose of the invention is to enable performing an authentication process used to verify a station does not usurp the identification of someone else, particularly during network installation. It is performed between a remote station adapter and its corresponding base station adapter, then between the base station and the wireless manager or more generally speaking the network manager (WM).

During network installation for a given customer, the network manager is first installed. But as per the authentication process, the operations deal with first base installation, then with individual remote stations, and/or the system may proceed with authenticating a second base station (if any), additional remote stations, and so on.

Figure 3A:
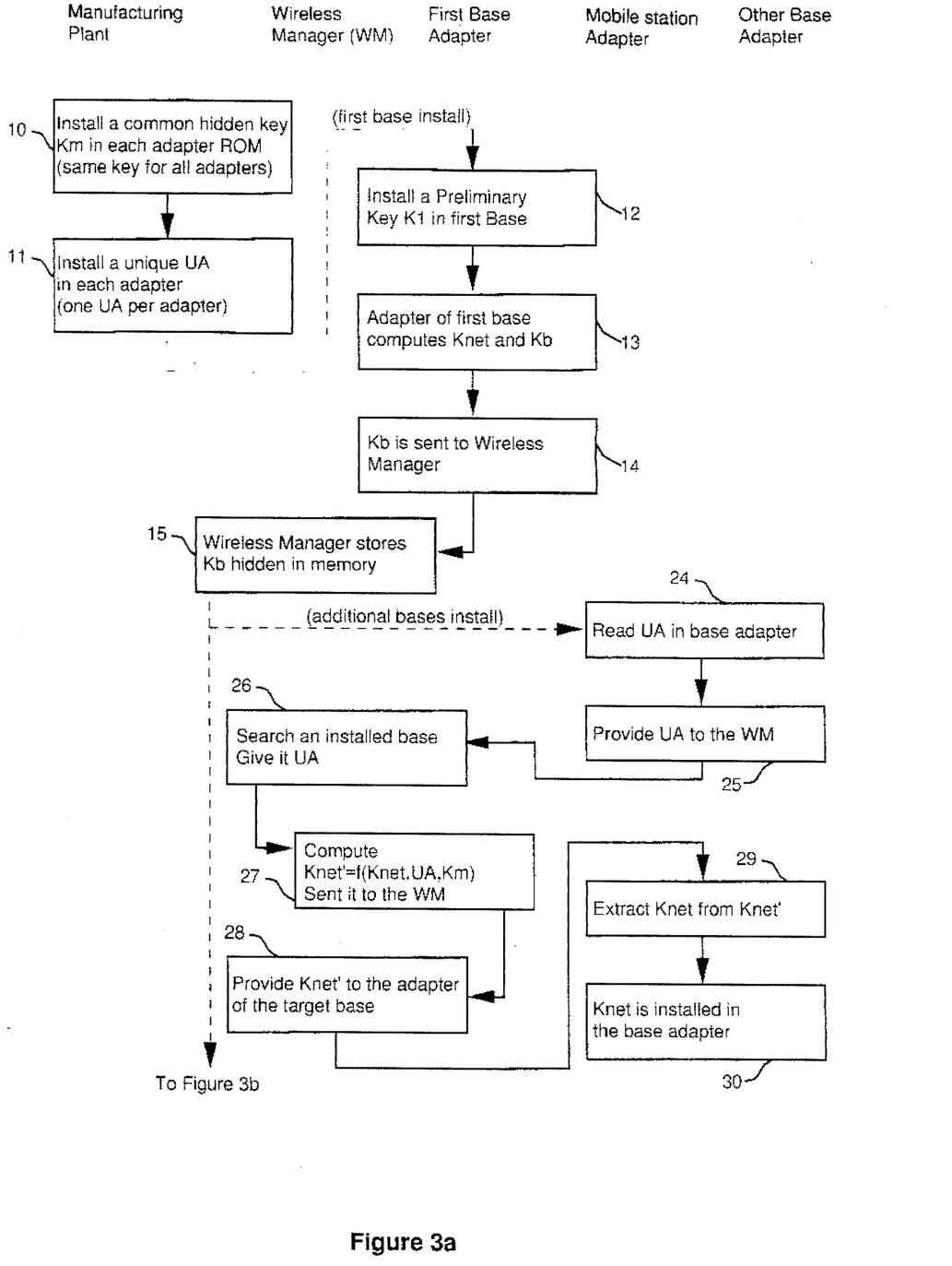
Figure 3B:
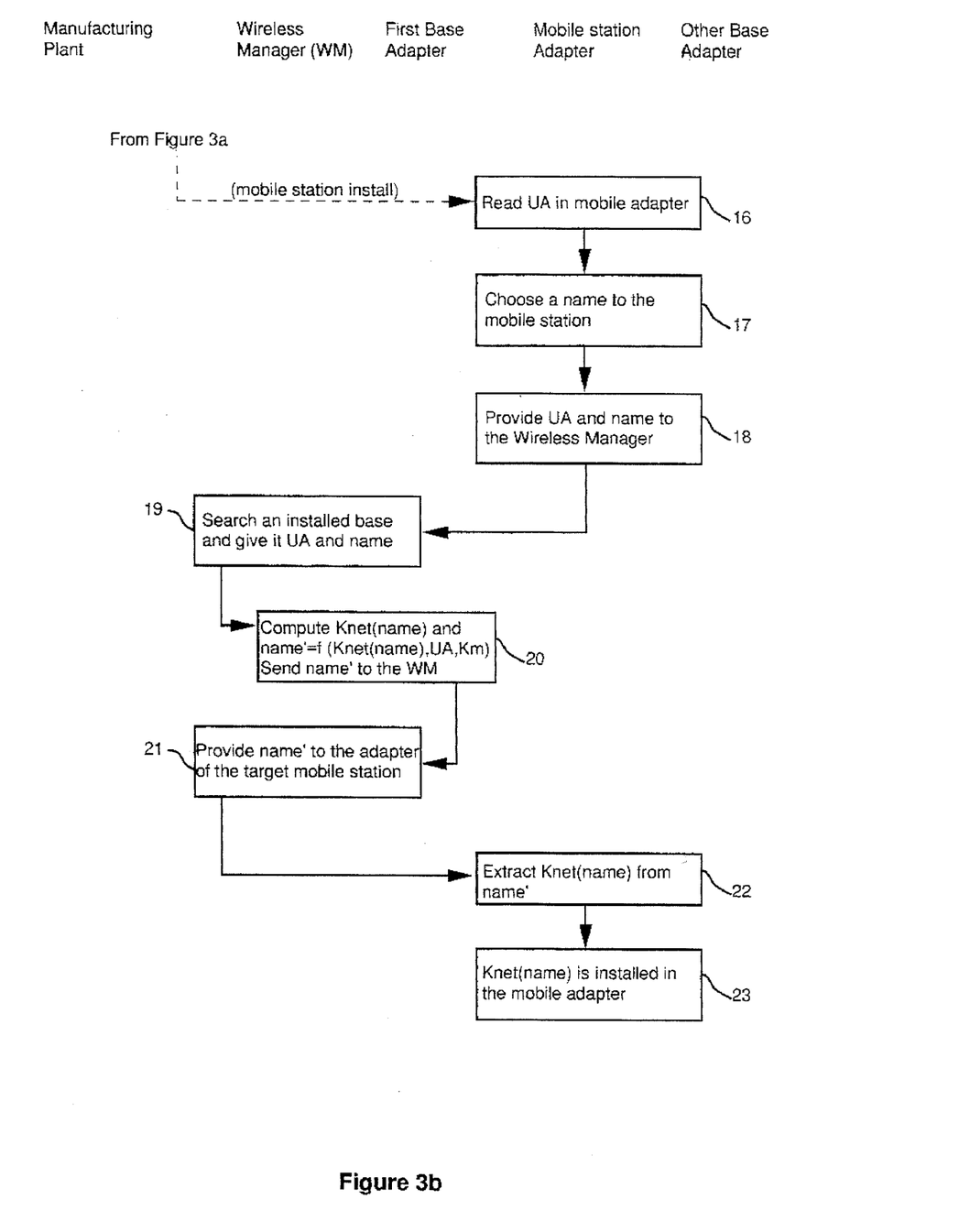

Represented in FIG. 3 is a general flowchart of the authentication key distribution method of this invention. The upper line shows the locations and network sub-system concerned with the authentication operations, i.e.: network manager (Wireless Manager), first base station, (mobile) remote station and other base stations (if any). But in addition, the flow chart shows that some operations are performed during the manufacturing of the various network components. For instance, a common key Km (the same for all manufactured adapters) is hidden by being included in the adapter programmable read-only memory (PROM) at manufacturing level. Also, a unique identifier, so-called Universally Administered Medium Access Control (MAC) address (UA) is also stored in the adapter PROM. This address is unique to an adapter. It may be made function of specific data provided to the manufacturer (e.g. IEEE provided identifier (IEEE address range)).

Using those adapters, carrying the Km key and UA parameters (see step 10 and 11 in FIG. 3), one may start performing the operations for authentication key initialization (installation) on the first base adapter. The process includes installing a preliminary key K1 in first base station (step 12), then the first base adapter is triggered to generate a network key Knet and a backbone key Kb (13) using a predefined logical function, from the network key Knet. Said backbone key Kb is sent to the Wireless (network) Manager which stores it into a hidden storage position (steps 14 and 15).

The process may then proceed with installing mobile remote stations to be attached to the installed base station or installing additional base stations.

As per the remote stations installation, the system starts with reading the universal address (UA) stored in the remote station adapter PROM (step 16), and, by some predefined way, chooses a name for the considered remote station (step 17). Actually the considered remote station RS user runs a program provided with the adapter, conventionally referred to as the diagnostics program, and this triggers the display of the stored UA data. The remote mobile station name and address indications are forwarded to the network manager WM (step 18), e.g. by telephone, or by any other written/verbal means, to the corresponding operator. The network manager searches into its stored data, for an already installed base (in present implementation that would relate to the first or any already installed and still active network base), and provide it with the received mobile station UA address and name information (step 19) through the installed wired LAN circuits, for instance. The adapter base station encrypts the name by using Knet as an encryption key, to derive Knet-(name) which actually stands for E(Knet, name), where E(x) is an encryption function, Knet is used as the encrypting key and name is the encrypted data. This notation will herein be used throughout the following text. The first base adapter also generates a new name parameter, so-called name', by using a predefined logic function using the parameters Knet(name), UA and Km (step 20), then sends name' to the mobile remote station adapter (step 21) via the wireless manager, using a secure protocol. In other words, name' acts as a password provided to the remote station which avoids communicating Knet(name) in clear. The mobile remote station knowing the logic function applied in the corresponding base station, extracts Knet(name) from name' (step 22) and stores it (step 23) safely in some protected memory.

A similar approach is also used to deal with installing, additional bases (so-called "another" base station), except that in this case, no name data is required.

When the adapter hardware is installed, the new base station operator retrieves its UA address (step 24) using a conventional diagnostics program. Before configuring the base station, the operator provides this address (UA) to the network administrator at the network manager location (step 25). The network or so-called wireless manager searches for an already installed base (e.g. first base station) and provides it with the said UA parameter (step 26). The installed base station computes an external view of the network key, i.e. Knet', dedicated to the new base station, as a function of Knet, UA and Km (step 27) and sends it to the network manager using a predefined secure (authenticated) protocol.

The Knet' parameter is provided to the target base adapter being installed.

In some cases, the network might be simplified with the Wireless Manager function being installed in the first base station. Accordingly, this might further avoid transporting security data on the LAN backbone. The network key is then entered in the first base station thru a conventionally installed configuration menu.

In any case the new base station extracts Knet from the received Knet' (step 29) and installs it safely in its base adapter memory (step 30).

Accordingly the authentication process is also made as safe as possible by avoiding need for forwarding sensitive data in clear, as much as possible.

Figure 4A:
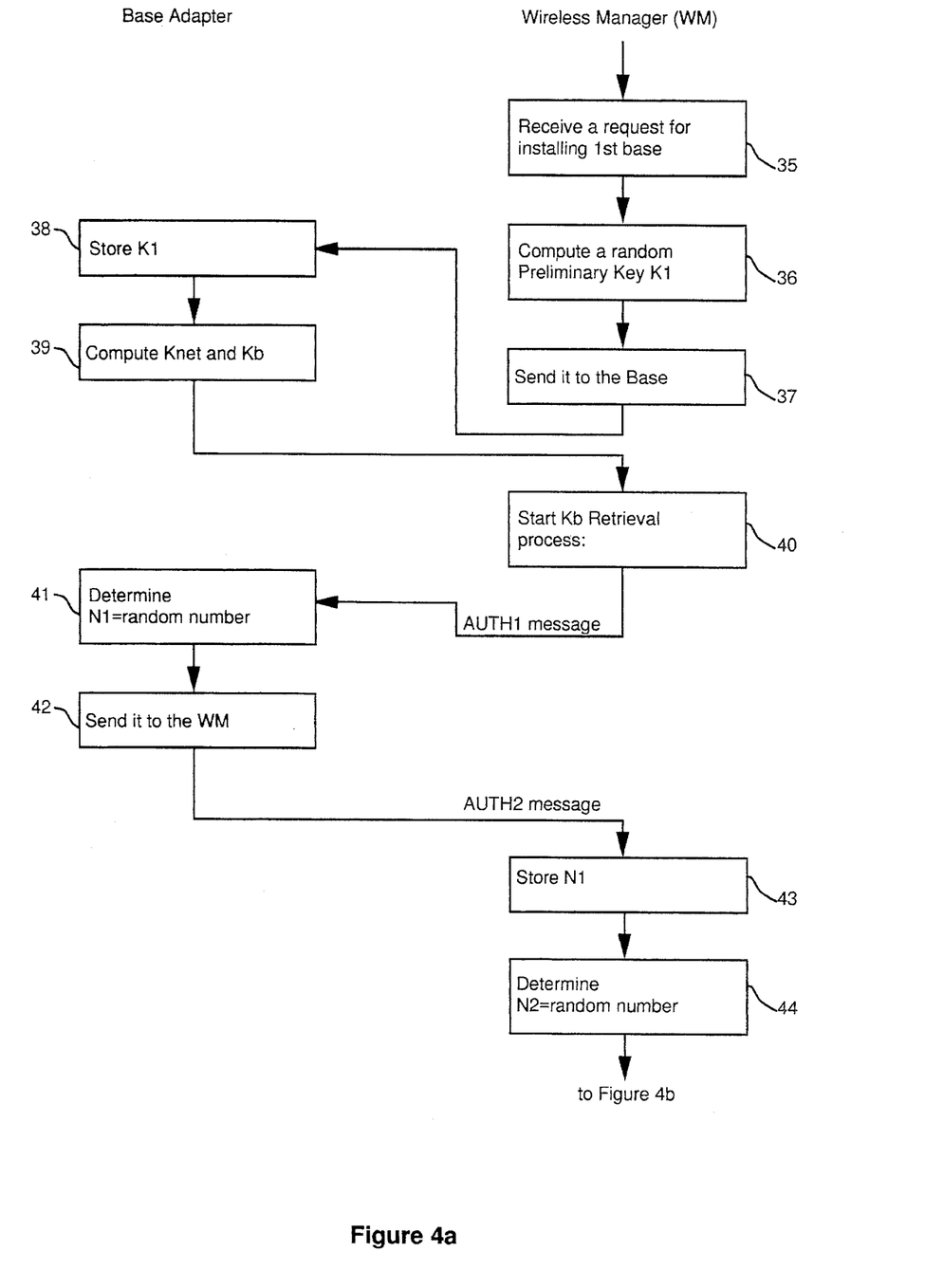
Figure 4B:
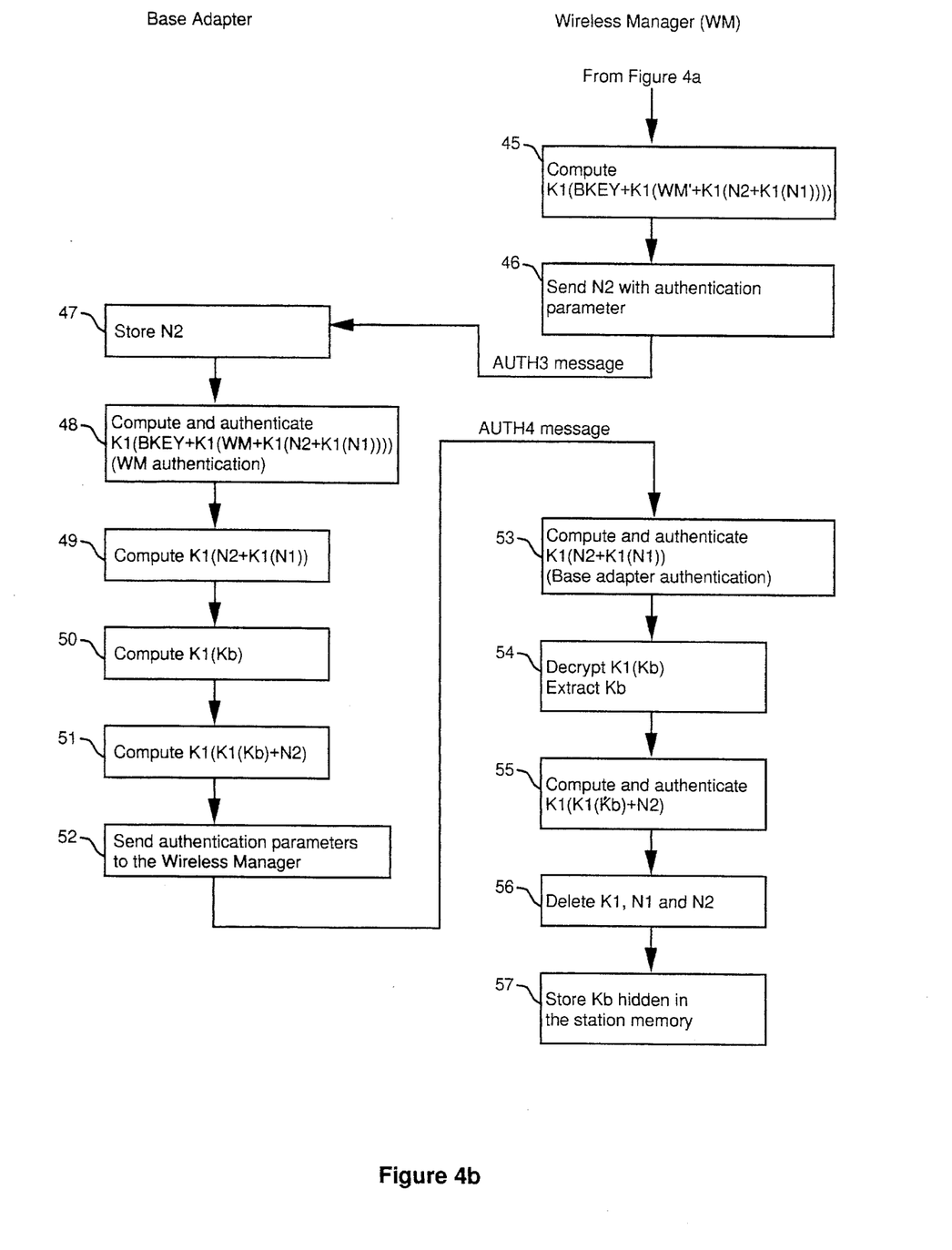

More detailed information on first base installation procedure are provided in FIG. 4.

The operations start in fact with the network manager receiving a request for first base installation (step 35). A random generator of any known kind is then triggered to compute the preliminary key K1 (step 36) and send it to the base through the LAN wired circuit (step 37).

The reception of K1 is used to trigger the generation of the network key Knet (step 39). This may for example be performed by a conventional random generator simply generating Knet as a random number. The same Knet key shall be used for the whole network. The base station also computes the backbone key (Kb) to be used to encrypt security messages when they flow on the LAN backbone. Kb is derived from Knet. The Wireless Manager (network manager) is then triggered for starting a Kb retrieval process for further use for next base or remote station installation (step 40). To that end, the Wireless Manager sends a first message (AUTH1) to the base station. Upon receiving said message, the base station generates a random number N1 (step 41) and sends it to the Wireless Manager (step 42) through a returning message (AUTH2). The Wireless Manager stores N1 and randomly generates a number N2 (steps 43 and 44). The network manager starts then generating an authentication requesting message on basis similar to those described by Ray Bird et al in IEEE Journal on Selected Areas in Communications, June 1993, Vol 11 No5 pp 679–693. This message contains as parameter the result of K1 (BKEY $\oplus$ K1 (WM' $\oplus$ K1 (N2 $\oplus$ K1 (N1)))).

More particularly, the network manager starts encrypting N1 with the key K1, performs a logic Exclusive OR (XOR) function, represented by the $\oplus$ symbol, with N2, encrypts the result with K1 then again performs a XOR function with a parameter WM' (a common parameter also known by the base adapter as the Wireless Manager identifier), re-encrypts with K1, XORes again with a constant data BKEY (defined at manufacturing level and known by each adapter) indicating that the Wireless Manager wants to retrieve the backbone key Kb, and finally encrypts again with K1. The authentication request message AUTH3 shall also include N2 (steps 45, 46).

This message is forwarded to the first base which extracts and stores N2. Then said first base station performs (step 48) the same operations that were performed in step 45 in order to authenticate the Wireless Manager as the originator of the message. The base station starts computing K1(N2 $\oplus$ K1 (N1)) or in other words encrypts N1 with K1, performs a XOR function with N2, and encrypts the result again with K1 (step 49). Then the backbone key is encrypted with K1 (step 50). And finally K1(K1(Kb $\oplus$ N2)) is computed in step 51.

Those authentication parameters are forwarded to the Wireless Manager in an authentication message AUTH4 (step 52).

The Wireless Manager proceeds to base adapter authentication by computing K1 (N2 $\oplus$ K1 (N1)) and comparing the data obtained to the received data (step 53). Then it decrypts the encrypted backbone key to derive Kb therefrom (step 54). It encrypts K1(N2 $\oplus$ K1(Kb)) using the key K1 (step 55) to enable authenticating the message received from the base station (see step 51). Finally, the Manager deletes K1, N1 and N2 and stores the backbone key in a hidden Manager's memory location (steps 56 and 57).

Therefore, using a safe authentication protocol, the Wireless Manager has been provided with the backbone key which shall later be useful to installing additional base and remote stations that may be required to build up the complete data network.

Let's, for instance, proceed with another (i.e. 2 , 3). base station to be attached to the network. This involves, as already mentioned in connection with FIG. 3, using the first, or any other installed base station which should already store the network key, Knet, extract Knet, and provide said network key to the base to be installed. For security purposes, Knet is not provided as such but rather encoded into a Knet' parameter derived from using a predefined logic function operated over Knet, the base adapter UA and the key Km installed in each adapter in the PROM containing the code, at manufacturing time. In addition, as already explained with regard to FIG. 4, authentication parameters are also used to reinforce the transmission security using again a protocol similar to the protocol recommended by Ray Bird et al (see above).

Figure 5:
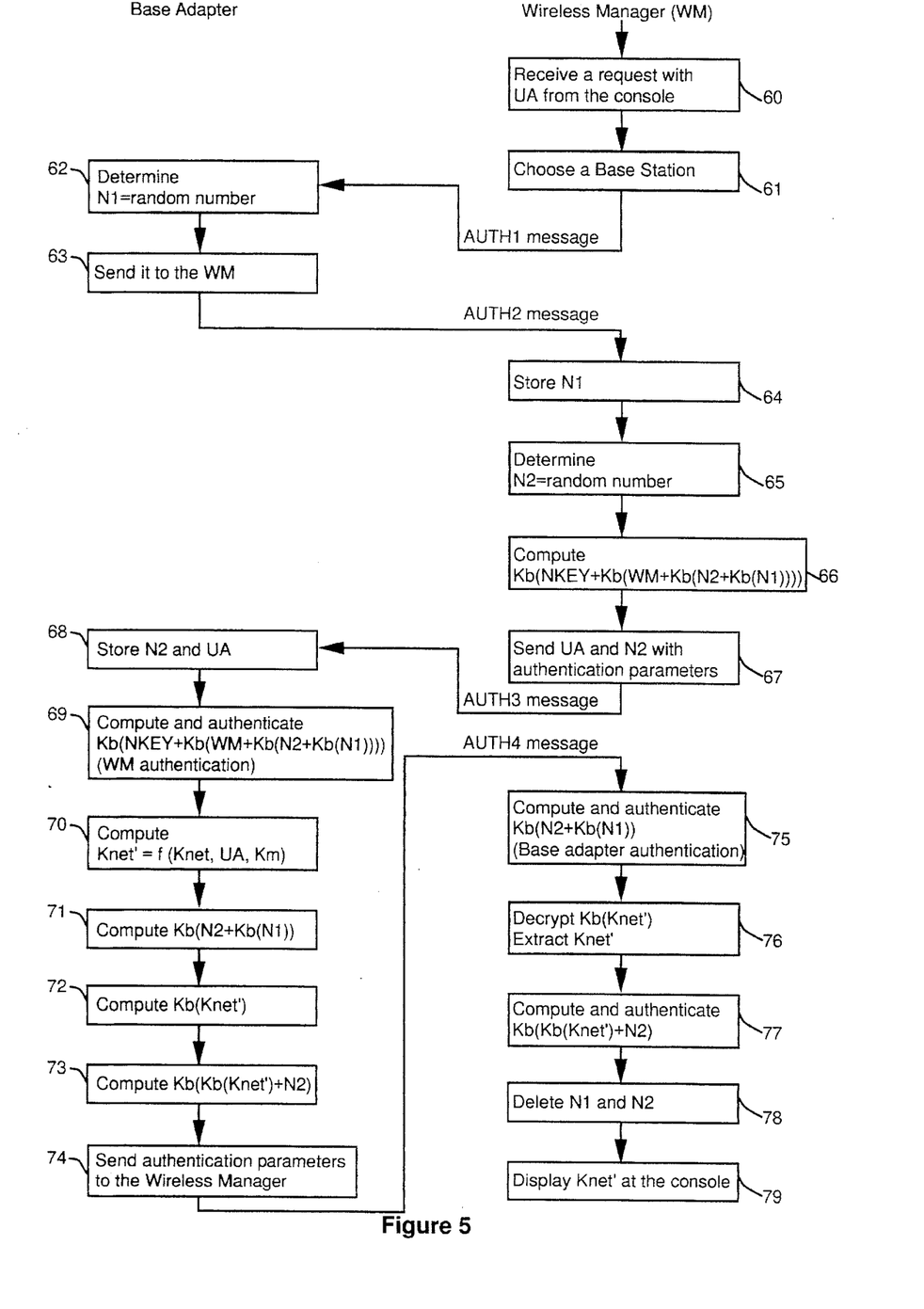
FIG. 5 and FIG. 6 are flow charts for implementing the invention.

The "other" new base installation method is described in full details hereunder with reference to FIG. 5.

As already mentioned, the new base station operator retrieves its address (UA) using a diagnostics program. It then provides the Wireless Manager with the UA value (step 60). The Wireless Manager chooses an installed base station and contacts it (step 61) with a message AUTH1. This information is used in the base station to trigger a random generator providing a random number N1 (step 62), which is sent to the Wireless Manager in a message AUTH2 (step 63) and stored therein. The reception of N1 triggers the generation of a random number N2 (step 64). The network Manager then initiates the generation of the authentication data to be used for network security checking, i.e.

$$Kb(NKEY \oplus Kb(WM' \oplus Kb(N2 \oplus Kb(N1)))). \qquad (1)$$

with NKEY set during manufacturing in each adapter to be used in the network (written in the microcode). As a matter of fact, NKEY is defined the same way BKEY was.

The message AUTH3 including the result of operation (1) and UA and N2 generated in the Wireless Manager, is forwarded to the already installed base selected for delivering Knet information (steps 67, 68).

The receiving base adapter first authenticates the received message origin (Wireless Manager) by computing:

$$Kb (NKEY \oplus Kb(WM \oplus Kb(N2 \oplus Kb(N1)))) \qquad (2)$$

Should the generated data (2) be identical to (1), authentication test is positive (step 69). Otherwise, the process is stopped and a warning is sent to a network administrator.

The base adapter then computes the following:

$$\text{step 70:Knet'=f(Knet, UA, Km)} \qquad (3)$$

wherein f(x) stands for a predefined logic function performed over the variable x, $$\text{step 71:Kb(N2} \oplus \text{Kb(N1))}, \qquad (4)$$

step 72:Kb (Knet'),  (5)

step 73:Kb(Kb(Knet') ⊕ N2).  (6)

And the last three parameters are included in an AUTH4 message sent to the Wireless Manager. Said Wireless Manager starts with checking for authenticating the sending base adapter identity, by computing Kb(N2 ⊕ Kb(N1)) in step 75 and comparing the result to the received data (4). Should this test succeed, then the Wireless Manager proceeds with decrypting Kb(Knet') to obtain Knet' (step 76) and use it (step 77) for further authentication by computing Kb(Kb(Knet') ⊕ N2) to be checked for match with (6).

Then N1 and N2 are deleted (step 78) and Knet' is displayed to the Wireless Manager operator (step 79) to be forwarded (e.g. by telephone), or by any other verbal/written means, to the installator of the new base station. Knet' is entered into said new base adapter which, knowing the inverse function of f(x), derives Knet therefrom, stores it, derives Kb from Knet using the same logic as in the first base station adapter, and deletes Knet'. The new base station is then fully installed.

Figure 6:
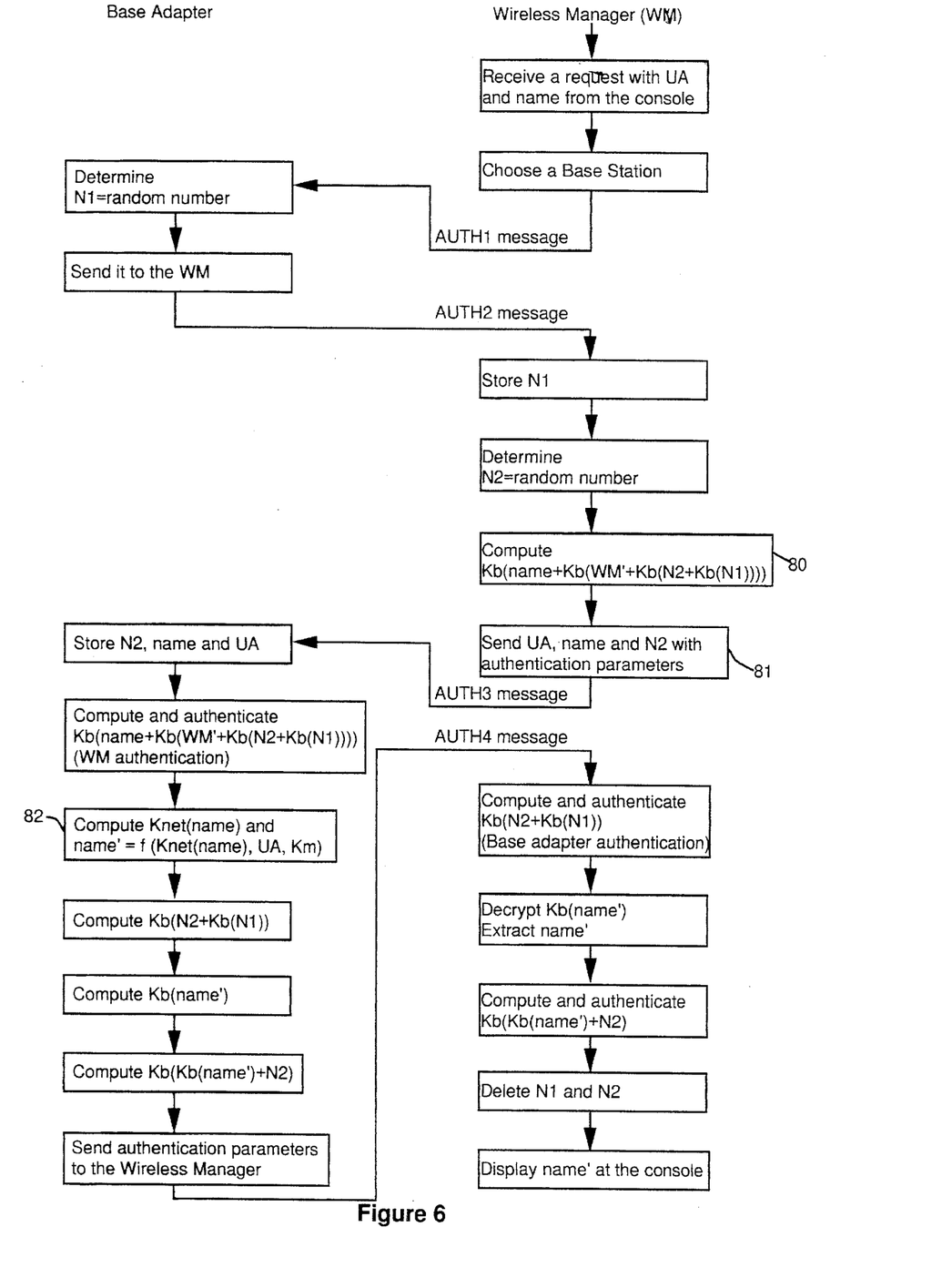

Represented in FIG. 6 is the detailed flow-chart relative to a remote station installation. As mentioned in connection with FIG. 3, the installations of both remote station or "another" base station (i.e. other than first base station) look very similar to each other, except for the presence of the so-called "name" parameter to be used for remote station installation and not for the "another" base installation.

Therefore the Wireless Manager (network manager) is provided with the said remote station address UA and name. Since Knet is to be used in the process, the Wireless Manager chooses again any active already installed base station and starts with triggering therein the generation of a random number N1. Said N1 is provided to the Wireless Manager for storage and triggering of random number N2 generation. The network manager initiates again the generation of the authentication data, which now involves using the "name" parameter. The computed data is then:

step 80:Kb(name ⊕ Kb(WM' ⊕ Kb(N2 ⊕ Kb(N1))))  (7)

The parameters forwarded to the base station now include: UA, N2 and "name" and the result of equation (7) (step 81).

The receiving base station authenticates the Wireless Manager provenance by performing, as was done for said "another" base station (see above), the logic operations of equation (7) with the received parameters and starts encrypting the name by using the base stored Knet data as an encryption key and computing a name' as a predefined function of (Knet (name), UA and Km) (see step 82).

Then start the computations of:

Kb(N2 ⊕ Kb(N1))

Kb(name')

Kb(Kb(name') ⊕ N2).

All these data are included in an AUTH4 message sent to the Wireless Manager. Said Wireless Manager starts with checking for authenticating the sending base adapter identity through computation and authentication of Kb(N2 ⊕ Kb(N1)). It then decrypts Kb(name') and extracts name'. The authentication process proceeds with computation and authentication of the last parameter, Kb(Kb(name') ⊕ N2).

Once these authentications are declared positive, name' is displayed on the operator's console and forwarded for further use by the remote station which extracts Knet (name) therefrom and stores it.

We claim:

1. A method for key distribution and authentication for enabling secure data traffic in a data transmission network wherein remote stations are to be attached to a network manager via at least one base station, said method including for network installation:

installing a common hidden key Km and a unique individual identifier UA in each station to be used in the network;

installing a first base station, said installation including:
    generating, in said network manager, a preliminary key K1 and installing said K1 key in said first base station;
    using said preliminary key installation to trigger the selection, within said first base station, of a network key Knet and of a derived backbone key Kb, therefrom;
    forwarding said Kb to the network manager and storing said Kb therein;

optionally installing "another" base station, said another base installation including:
    reading the said another base station identifier UA;
    forwarding said another base station identifier UA to said network manager;
    said network manager searching an installed base station and providing said installed base station with said another base station identifier UA;
    computing within said installed base station a parameter Knet' as a predefined logic function of Knet, Km and said another base station identifier UA;
    providing said another base station with said Knet';
    said another optional base station extracting said network key Knet from said Knet' based on the knowledge of said predefined logic function and storing said network key within said another base station;
    deriving Kb from Knet in the new base station;

installing a remote station, said remote station installation including:
    reading said remote station identifier UA;
    choosing a "name" for said remote station;
    providing both said remote station identifier UA and said name to said network manager;
    said network manager searching an installed base station and providing said installed base station with said remote station identifier UA and said chosen name;
    encrypting within said installed base station, said name with said network key Knet, and computing a name' parameter as a predefined logic function of encrypted name, Km and said remote station identifier UA;
    providing said name' to said remote station, said remote station deriving the encrypted name therefrom, based on the knowledge of said predefined function, and storing said encrypted name into said remote station.

2. A method for key distribution and authentication according to claim 1, wherein said preliminary key K1 is randomly generated within said network manager.

3. A method for key distribution and authentication according to claims 1 or 2 wherein said network key Knet is randomly generated within said first installed base station.

4. A method for key distribution and authentication according to claim 3, wherein said forwarding the backbone key Kb to the network manager includes encrypting said backbone key Kb with the preliminary key K1 and including said encrypted backbone key into a base authenticating message using predefined parameters known to both the base station and the network manager.

5. A method for key distribution and authentication according to claim 1 wherein said providing said another base station with said Knet' includes encrypting said Knet' with said backbone key Kb and including said encrypted Knet' into a said installed base authentication message using predefined parameters known to both said installed base station and said network manager and providing said authentication message to said network manager.

6. A method for key distribution and authentication according to anyone of claims 1, 2 or 5, wherein said data transmission network is a so-called wireless LAN and said remote stations are individually connected to a given base station via a radio link.

7. A method for key distribution and authentication according to claim 6 wherein said radio link uses the so-called frequency hopping technique with all the remote stations attached to a given base station using a same frequency hopping pattern.

8. A method according to anyone of claims 1, 2 or 7 wherein said first base station is installed within said network manager.

9. A system for key distribution and authentication for enabling secure data traffic in a so-called wireless LAN network wherein remote mobile stations are to be connected through wireless links to a so-called network or wireless manager, via so-called base stations connected to said network manager via a backbone network including a wired LAN, said system being characterized in that it includes:

read-only storage means within each mobile station and base station adapter unit, with a common hidden key Km and an individual identifier UA stored therein during manufacturing;

means for installing a first base station, said means for installing a first base station including:

a random generator for generating within said network manager adapter, a random preliminary key K1;

means for forwarding K1 to said first base station adapter;

means, within said first base adapter, triggered by said K1 key for generating a random network key Knet, and for deriving a Kb parameter therefrom;

means, within said base station for encrypting Kb with the K1 key, for embedding said encrypted Kb within base authentication parameters known to both the base station and the network manager, and for transmitting said encrypted Kb and authentication parameters to said network manager; and, means, within said network manager for extracting and storing Kb after authenticating the originating base station, and subsequently installing any remote station or any additional or so-called "another" base station by using means for addressing the already installed base station for computing therein a predefined function of, inter alia, network key Knet, and for forwarding the so computed data to the network manager and said any remote station or said "another" base station.

* * * * *